United States Patent [19]

Trop

[11] Patent Number: 4,590,077

[45] Date of Patent: May 20, 1986

[54] POWDERED COMPOSITION FOR MAKING ACIDIFIED MILK PRODUCTS

[75] Inventor: Moshe Trop, Beer Sheva, Israel

[73] Assignee: Ben-Gurion University of the Negev Research and Development Authority, Israel

[21] Appl. No.: 276,265

[22] Filed: Jun. 23, 1981

Related U.S. Application Data

[63] Continuation of Ser. No. 10,469, Feb. 8, 1979, abandoned.

[30] Foreign Application Priority Data

Feb. 15, 1978 [IL] Israel ..................................... 54049

[51] Int. Cl.$^4$ ........................... A23C 9/12; A23C 9/15; A23C 9/152; A23C 9/154
[52] U.S. Cl. ........................................ 426/61; 426/34; 426/42; 426/63; 426/583; 426/588
[58] Field of Search .................. 426/34, 36, 42, 43, 426/39, 61, 63, 573, 582, 583, 588

[56] References Cited

U.S. PATENT DOCUMENTS

| | | | |
|---|---|---|---|
| 3,080,236 | 3/1963 | Ferguson, Jr. | 426/588 X |
| 3,170,795 | 2/1965 | Andre | 426/551 |
| 3,359,116 | 12/1967 | Little | 426/583 |
| 3,432,306 | 3/1969 | Edwards | 426/583 X |
| 3,793,465 | 2/1974 | Bohren | 426/43 X |
| 3,917,875 | 11/1975 | Gardiner | 426/573 |
| 4,066,791 | 4/1978 | Corbin, Jr. | 426/588 X |

FOREIGN PATENT DOCUMENTS

2007800 1/1970 France .
37-15270 9/1962 Japan .

OTHER PUBLICATIONS

Van Wazer J. R., Phosphorus and Its Compounds, vol. II: Technology, Biological Functions and Applications, Interscience Publishers, Inc., N.Y. 1961 (pp. 1606, 1608, 1609, 1614, 1615 and 1637).

*Primary Examiner*—David M. Naff
*Attorney, Agent, or Firm*—Lowe, Price, Leblanc, Becker & Shur

[57] ABSTRACT

An acidified milk product such as yogurt is prepared by mixing a powdered dry mix composition with milk or water. The composition for mixing with milk contains an acidogen and a mild acidic buffer. The composition for mixing with water additionally contains dry milk. The acidogen is preferably a lactone, anhydride or ester-enzyme esterase pair and the buffer is preferably a citrate, phosphate, tartarate or malate salt. When the composition is mixed with milk or water, the buffer reduces the time for jellying by reducing the pH close to the point of jellying such that the acidogen need only further reduce the pH about 0.3 to about 0.9 pH units.

13 Claims, No Drawings

POWDERED COMPOSITION FOR MAKING ACIDIFIED MILK PRODUCTS

This is a continuation of application Ser. No. 010,469, filed Feb. 8, 1979 now abandoned.

The present invention relates to powdered compositions and methods for the manufacture of acidified milk products therewith. More particularly the present invention relates to a powdered composition suitable for mixing with milk or water to form an acidified milk product having the delicate texture normally associated with natural yogurt and other sour milk products.

Yogurt, is a milk product having a gelled texture and biologically acidified by means of *Lactobacillus bulgaricus* and *Streptococcus thermophilus*, the pH of which are about 4.1 to 4.6.

The basic theory behind the use of yogurt has been to implant a beneficial culture of *Bacillus bulgaricus-Lactobacillus acidophilus* in milk, to allow this mixture to incubate until these particular species of bacilli sour the milk and then chill the product to prevent further growth.

The use of yogurt has been quite popular and common as it forms not only a healthful but a pleasant food substance which may be enjoyed for its flavor, its health qualities or its reputed regulatory effect on the bowel movement.

When yogurt in its usual form is dehydrated it cannot be reconstituted into the smooth, creamy, pleasant tasting product by the simple addition of water, as might be expected.

It has been found that during drying the characteristic texture of the yogurt is lost, the yogurt reconstituted from yogurt powder with water remains fluid and the coagulated phase tends to separate rapidly from the aqueous phase.

Previous attempts to manufacture yogurt in powder form have resulted in a culture which could be implanted in milk and allowed to grow quickly and vigorously in a type of "do-it-yourself" yogurt manufacture. These attempts, however, at rapid manufacture of yogurt have resulted in poorly controlled growth conditions which yielded an inferior quality and taste.

The method described in U.S. Pat. No. 3,793,465 where a milk product is biologically acidified to pH of 4.2 and combined with a non-acidified milk product and acid compound with control release to yield a yogurt-like product has also proven to be too expensive and not practical.

In U.S. Pat. No. 3,080,236 there is described an instant yogurt produced adapted when mixed with water to form a synthetic yogurt composition, said product comprising dried yogurt culture, a water soluble dried milk, an edible vegetable oil and a water-soluble dried starch, however, as will be realized said patent is also based on a powdered yogurt culture, which is dried in a vacuum drier to overcome some of the prior dehydrating and reconstituting difficulties.

In U.S. Pat. No. 3,917,875 there is described a powdered dessert composition suitable for mixing with milk to obtain an acidic dessert consisting essentially of 5.0 to 20.0 percent of a cold water-soluble gelatin, 0.2 to 5.0 percent of a stabilizer, 5.0 to 25.0% of a pregelatinized starch, 2.0 to 7.0 percent of a food acid, 40.0 to 75.0 percent of a sweetening agent, from 0.0 to 25.0 percent yogurt powder, from 0.0 to 10.0 percent of an emulsifier and from 0.0 to an effective amount of color and flavoring ingredients, all percentage being by weight of the powdered dessert composition, which patent does not rely on dry yogurt powder culture and instead uses a natural acid to achieve the acidifying effect.

It has been found however, that the direct introduction of an acid in powder form does not produce a homogenous gradual development of an acidic solution which is essential to the delicate texture associated with natural yogurt and sour milk products.

In contradistinction to said prior art processes and products and according to the present invention it has now been found that it is possible to achieve the product texture desired without relying on bacterial action of a dried culture.

Thus the present invention provides a powdered composition suitable for mixing with milk to obtain an acidified milk product comprising, per liter milk liquid, about 10 to about 50 g of an acidogen and about 2.5 to about 20 g of a mild acidic buffer, as well as providing a powdered composition suitable for mixing with water to obtain an acidified milk product comprising per liter liquid about 10 to about 50 g of an acidogen, about 2.5 to 20 g of mild acidic buffer and about 90 to about 240 g dry milk.

As is known and as used herein the term acidogen refers to a composition adapted to undergo spontaneous hydrolysis in aqueous medium. The acidogen used is preferably selected from the group consisting of lactones and anhydrides such as glucono delta lactone, lactide, propionic anhydride, propionic isovaleric mixed anhydride, acetic-isovaleric mixed anhydride, acetylvaleryl mixed anhydride, acetyl butyryl mixed anhydride or from an ester-esterase enzyme pair such as the esters of citric, tartaric, acetic, malic, lactic, fumaric, maleic and adipic acid in combination with enzyme esterase.

As will be realized in essence the present invention is based on the interaction of the acidogen, the buffer and milk in aqueous medium and thus the acidogen and buffer can be packaged together in dry form for addition to milk or can be packaged together with dried milk for later addition to water.

The present invention is thus directed toward an acidifying dry mix which can be reconstituted quickly and simply with cold milk or water without curdling of the milk proteins, to produce a tangy or yogurt-like dessert which will not deteriorate on standing for relatively long periods of time after its preparation.

One of the advantages of the product of the present invention is that the acidogen turns to acid gradually by hydrolysis with aqueous medium and thereby simulates the action of bacterial fermentation of lactose which also is a gradual homogeneous acidifying process.

The products of the present invention also have the following advantages:

(a) The innovative product in powder mix form can be prepared to form a yogurt-like composition without the use of household machinery, without kitchen utensils and without a blender. All that is required is a spoon for stirring and a container to hold the contents. The yogurt-like composition is therefore freshly prepared at all times and prepared in the desired quantities. The powder is mixed with milk or water and forms into a yogurt-like composition within 30 to 50 minutes. In comparison, the natural yogurt requires 14 hours of processings before it is ready for consumption;

(b) The innovative product in powder mix form packaged in plastic or aluminum foil can be stored almost anywhere in the home, at the place of work, in an office, in a vehicle, in a boat or in a plane, without the need of refrigeration. Like a teabag it can be carried in the purse, in the shirt pocket, or in the wallet. It can be prepared as a luncheon dessert, a coffee break snack or a mid-night delight. In comparison, the natural product requires refrigeration and, must be consumed within a limited period, otherwise it spoils. It is too bulky to be carried and cannot be transported for distances without refrigeration;

(c) The innovative product when prepared as a yogurt-like composition contains all the vitamins and proteins of ordinary milk. In comparison, the natural yogurt product which is formed by bacterial fermentation lacks some of the vitamins which have been destroyed or depleted as a result of the bacterial action and has less protein;

(d) As compared with an equal supply of a natural yogurt, the composition of the innovative product costs no more than one-half of the natural commercially sold product;

(e) The instant yogurt in powder mix form packaged in plastic or cellophane or aluminum foil containers can last six or more months without the need of refrigeration, without the fear of spoilage and without the danger of contamination. In comparison, the natural yogurt product which is formed by bacterial fermentation requires refrigeration against spoilage and contamination.

(f) The instant yogurt can be flavored homogeneously and completely with any flavor. Additional ingredients such as sugar or acid do not prove detrimental to the product. In comparison, the natural yogurt product which is formed by bacterial fermentation has a limited selection and choice of flavors. Too much sugar tends to inhibit or interfere with the bacterial fermentation. Also, the natural yogurt product cannot be completely and homogeneously flavored throughout the entire composition;

(g) The innovative product, does not lose any of its body texture when it is prepared, frozen and subsequently thawed out;

(h) The instant yogurt can be used safely and without any negative reaction by individuals allergic to products produced by means of biological fermentation and who are not allergic to milk products;

(i) The instant yogurt product in powder mix form can also be mixed with "half and half" cream to produce an instant sour cream composition;

(j) The instant yogurt product in powder mix form can be supplemented with a protein and a fat substance derived from plant sources in addition to the sodium caseinate, thereby producing a non-dairy yogurt-like product with reduced cholesterol;

(k) The instant yogurt product in powder mix form can be processed to produce a whipped ice cream or a frozen yogurt composition; and (l) The mix of the present invention can be incorporated in milk based desserts without coagulation of the milk protein and allows the formulation of fruit-flavored desserts which simulate the flavor and texture of flavored yogurt including the formulation of whipped frozen yogurt and yogurt fruit flavored ice cream.

The present invention also provides a method for the manufacture of an acidified milk product from a dry powdered mix composition comprising combining with milk a dry mix containing per liter liquid, about 10 to about 50 g of an acidogen and about 2.5 to about 20 g of a mild acidic buffer, gently stirring for about 1 to 4 minutes and allowing the product to stand for about 20 to about 60 minutes and a method for the manufacture of an acidified milk product from a dry powdered mix composition comprising combining with water a dry mix containing per liter liquid, about 10 to about 50 g of an acidogen, about 2.5 to about 20 g of a mild acidic buffer and about 90 to about 240 g dry milk, stirring for about 1 to 4 minutes and allowing the product to stand for about 20 to about 60 minutes.

While the three above enumerated ingredients are in fact sufficient for producing the desired product other ingredients can preferably be added to improve or modify taste and texture.

Thus the above powdered mix composition can further comprise one or more milk clotting enzymes, emulsifiers, stabilizers, taste additives, flavorings or sugars wherein all of said components are in anhydrous fine powder form. Such additional ingredients and their function are described and exemplified hereinafter as follows:

(a) Stabilizers and thickeners such as pregelatized starch and gums like gum arabic, guar gum, irish moss, sodium alginate and carboxymethyl cellulose or a combination thereof. The combination of the stabilizers and thickeners affords increased stability to the finished yogurt, permits rapid hydration, quick setting of the jellying material, increases the viscosity and provides a better body and texture of the finished product. Range in the formula: 1 g–25 g/liter liquid.

(b) An Emulsifier such as tween 60 and lecitin. The emulsifier appears to aid in the rehydration, to contribute smoothness and to suspend insoluble particles in the mixture. Also it stabilizes the particles of the lipids in the yogurt. The emulsifier could be coated on the granules of either the sugar or any other part of the powder mix. Range 1 g–5 g/liter.

(c) Sugar-Sucrose is the preferred sugar to be used as a sweetener although other sugars such as dextrose, corn syrup solids, lactose, etc. may of course, be used. Such sugars may be employed singly or in combination. Moreover, artificial sweeteners such as, for example, edible saccharin salts, dipeptide salts and the like may be included in the dry mix to replace all or part of the sugar. Range: P1 100 g–200 g sugars/liter liquid, or
0.1–0.5 g artificial sweetener/liter liquid.

(d) A clotting enzymatic agent like pepsin derived from cow, turkey or chicken stomachs, or mucor pussilus enzyme, Aspergillus protease, penicillium protease, etc. One of these agents or a combination of two or more of them would jellify the casein of the milk within the desired period of time, even in a low pH. Range: 100 μg–10 mg/liter liquid.

(e) Flavors-The mix can also contain flavors such as strawberry, pineapple, apricot, lemon, etc. in amounts up to about 0.5% by weight to provide a flavor simulative of tangy fruit yogurt. Range: 0.05 g–5 g/liter.

If desired the mix can also contain:

(f) Yogurt flavor in powder form or in liquid. Range: 0.2 g–2.5 g/liter and/or (g) Dry starter cells such as *lactobacillus bulgaricus, streptococcus thermophillus* or *lactobacillus acidophillus*. This ingredient is favorable for natural aroma and taste in the finished yogurt; the alive cells may grow in the milk either during the waiting time for clotting or thereafter; and there are some opinions that such cells are important for health because they produce vitamins and effect is easing the bowel movement.

With regard to the main essential ingredients the function of the acidogen is to gradually and homogenously acidify the milk to the desired pH and to simultaneously act as a jellifying agent of the casein as the pH is lowered slowly below the iso-electric point of the casein and the function of the buffer is to reduce the time duration for jellying by reducing the pH close to the point for jellying which is approximately pH 4.8.

Without the buffer the jellying time is too long, and not practical because of the slow hydrolysis of the acidogen. Using a mild acidic buffer allows the acidogen to reduce the pH a short range of 0.3–0.9 pH units only, which is done within 10–30 minutes.

Employing a buffer also controls the decreasing of the pH, maintains it around pH 4.0 and does not allow it to decrease too much down thereby preventing the product from turning too sour.

Dry "milk" can also be added to the mix adapted for addition to milk in order to increase the casein content of the mix which clots by the enzyme and jellifies by the acid. High levels of casein provides a better body and texture. Non fat dry milk also increases the nutritious value of the product as it adds more proteins and vitamins. The dry milk could be in the form of skim, whole or fermented milk. Also it could be substituted by soybean protein or any other soluble protein, or a combination. Range in the formula is 10 g–120 g/liter liquid.

While the invention will now be described in connection with certain preferred embodiments in the following examples it will be understood that it is not intended to limit the invention to these particular embodiments. On the contrary it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

Unflavore sour yogurt

| | |
|---|---|
| Glucono delta lactone | 9 g |
| Calcium phosphate monobasic monohydrate | 1.5 g |
| Instant dry milk | 40 g |

The above dry powder composition was mixed with 200 ml tap water for about 2 minutes and allowed to stand for ½ to 1 hr upon which a uniformly consistant nonfermented yogurt-like product was formed.

EXAMPLE 2

Plain yogurt mix

| | |
|---|---|
| Glucono delta lactone | 10 g |
| Calcium phosphate monobasic monohydrate | 1.5 g |
| Monosodium citrate | 0.5 g |
| Instant non-fat dry milk | 20 g |
| Precooked starch Redisol 88 (Staley) | 1.0 g |
| Sodium alginate Keltone (Kelco) | 0.5 g |
| Yogurt flavor | 0.25 g |
| Tween 60 (coated on glucono delta lactone) | 1.0 g |

The ingredients are dissolved in 200 ml whole milk (3.8% fat) mixed well for three minutes and allowed to stand for 45 min. at room temperature.

EXAMPLE 3

Strawberry yogurt Mix

| | |
|---|---|
| Glucone delta lactone | 10 g |
| Calcium phosphate monobasic monohydrate | 2 g |
| Monosodium citrate | 0.5 g |
| Sugar | 25 g |
| Precooked starch Redisol 88 (Staley) | 1 g |
| Sodium alginate Keltone (Kelco) | 0.5 g |
| Freeze dried plain yogurt | 1.0 g |
| Yogurt flavor | 0.15 g |
| Strawberry flavor | 0.5 g |
| Red color | 0.1 g |
| Tween 60 coated on the sugar | 1.0 g |

The mix is dissolved in 200 ml milk (2.8% fat) mixed well for four minutes and allowed to stand at room temperature for 45 minutes.

EXAMPLE 4

Acidified Buttermilk

| | |
|---|---|
| Proprionic isovaleric anhydride | 3.8 g |
| Calcium phosphate monobasic monohydrate | 3.3 g |
| Citric acid | 0.25 g |
| Precooked starch | 2 g |
| Instant dry milk | 5 g |
| Buttermilk powder | 2.5 g |

The above composition was mixed thoroughly for 2–3 minutes with 200 ml milk and allowed to stand for 1–2 hrs to form an acidified buttermilk product.

EXAMPLE 5

Leben mix

| | |
|---|---|
| Lactide | 4 g |
| Calcium phosphate monobasic monohydrate | 3 g |
| Citric acid | 0.25 g |
| precooked starch | 1.5 g |
| Dry skim milk | 5 g |

The above dry mix was dissolved in 200 ml milk, stirred for 1 minute and allowed to stand 45 minutes to form a leben-like acidified milk product.

EXAMPLE 6

Whipped cold pineapple yogurt

| | |
|---|---|
| Isopropyl lactate | 4.5 g |
| Esterase | 5 mg |
| Monosodium tartarate | 1 g |
| Sugar | 30 g |
| Sodium caseinate | 2.5 g |
| Egg albumin | 2 g |
| Gelatine hydrolizate (partically) | 1.5 g |

-continued

| | |
|---|---|
| Pineapple flavor | 0.3 g |
| Yogurt flavor | 0.1 g |

The dry mix was dissolved in 200 ml milk at room temperature (having a 2.8% fat content) was mixed with an electric mixer for 2 minutes and allowed to stand for 1 to 1.5 hrs and then refrigerated to cool and whipped to proper consistancy with an electric mixer.

EXAMPLE 7

Sour Cream

| | |
|---|---|
| Hog. Pepsin | 200 μg |
| Glucono delta lactone | 10 g |
| Calcium phosphate monobasic monohydrate | 2 g |
| Instant dry whole milk | 20 g |
| Precooked starch | 1 g |
| Sodium alginate | 0.5 g |
| Guar Gum | 0.25 g |
| Yogurt flavor | 0.3 g |
| Tween 60 (coated on glucon delta lactone) | |

The powder is dissolved in 200 ml whole milk (3.8% fat), and let stand for 40 min. at room temperature.

EXAMPLE 8

Coffee Yogurt Mix

| | |
|---|---|
| Glucono delta lactone | 8 g |
| Instant dry whole milk | 5 g |
| Calcium phosphate mono basic monohydrate | 3 g |
| Precooked starch (National) | 0.75 g |
| Sugar | 25 g |
| Ground instant coffee (Taster Choice) ® | 2.5 g |
| Freeze dried Leben | 0.5 g |

The mix powder is dissolved in 200 ml milk (1% fat), mixed and allowed to stand for 30 minutes.

EXAMPLE 9

Yogurt Mix for Whipped Frozen Yogurt

| | |
|---|---|
| Glucone delta lactone | 100 g |
| Disodium citrate | 12.5 g |
| Citric Acid | 12.5 g |
| Freeze-dried yogurt | 40 g |
| Precooked starch | 10 g |
| Sodium alginate | 21 g |
| Skim milk powder | 75 g |
| Strawberry flavor | 10 g |
| Sugar | 600 g |
| Red color | 2.5 |

The mixture is dissolved in 4 liter pasteurized milk (2.8% fat), allowed to stand for 60 minutes at room temperature and then processed in a soft ice cream maker.

EXAMPLE 10

Yogurt Mix for Ice Cream

| | |
|---|---|
| Glucone delta lactone | 80 g |
| Disodium citrate | 10 g |
| Citric acid | 10 g |
| Precooked starch | 10 g |
| Dry yogurt powder (Bevita S.A.) | 23 g |

The powder is mixed with 4 liter of fruit flavored liquid ice cream mix and allowed to stand for 90 minutes at room temperature.

It will be evident to those skilled in the art that the invention is not limited to the details of the foregoing illustrative embodiments and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come with the meaning and range of equivalency of the claims are therefore intended to be embraced therein.

What is claimed is:

1. A powdered yogurt precursor composition which mixes with water to produce an acidified milk product having the texture, taste and appearance of yogurt, said composition comprising, for each liter of water with which it is to be mixed,
   (a) about 10 to about 50 g of an acidogen, said acidogen being adapted to undergo spontaneous hydrolysis in aqueous medium and turning to acid gradually so as to homogeneously acidify the milk and thereby simulate the action of the baterial fermentation of lactose, while simultaneously acting as a jellyifying agent as the pH is lowered;
   (b) about 90 to 240 g. of dry milk;
   (c) about 2.5 to about 20 g of a mild acidic buffer, said buffer being effective to control the decreasing pH when mixed with the milk thereby preventing the milk product from turning too sour; and said buffer being further characterized in that upon mixing with said water, said buffer causes the time duration for jellying of the resulting mixture to be reduced by reducing the pH of the mixture close to the point of jellying, whereafter said acidogen need further reduce the pH only a short range of about 0.3 to about 0.9 pH units.

2. A powdered yogurt precursor composition according to claim 1 wherein said acidogen is adapted to undergo spontaneous hydrolysis in aqueous medium and is selected from the group consisting of lactones, anhydrides and a combination of an ester an an esterase enzyme.

3. A powdered yogurt precursor composition according to claim 1 wherein said acidogen is selected from the group consisting of glucono delta lactone, lactide, propionic anhydride, propionic-isovaleric mixed anhydride, acetic-isovaleric mixed anhydride, acetic-valeric mixed anhydride and acetic butyric mixed anhydride.

4. A powdered yogurt precursor composition according to claim 1 wherein said acidogen is selected from the group consisting of esters of citric, tartaric, acetic, malic, lactic, fumaric, maleic and adipic acid in combination with enzyme esterase.

5. A powdered yogurt precursor composition according to claim 1 wherein said buffer is selected from the group consisting of sodium citrate monobasic, sodium citrate dibasic, calcium phosphate monobasic, sodium phosphate monobasic, sodium tartarate monobasic, sodium malate monobasic, or a combination thereof.

6. A powdered yogurt precursor composition according to claim 1 further comprising an additional ingredient selected from the group consisting of milk clotting enzymes, emulsifiers, stabilizers, flavorings and sugars and combinations thereof, wherein all of said components are in anhydrous fine powder form and said mix is adapted upon addition to water with gentle stirring for about 1 to 4 minutes to produce a yogurt-like product after standing for about 20 to about 60 minutes.

7. An article of manufacture comprising:
 (a) a package; and contained in said package,
 (b) a powdered composition for mixing with water to produce an acidified milk product having the texture of sour milk products, said composition comprising, for each liter of water with which it is to be mixed,
  (1) 90 to 240 g of dry milk,
  (2) about 10 to about 50 g of an acidogen, said acidogen being adapted to undergo spontaneous hydrolysis in aqueous medium and turning to acid gradually so as to homogeneously acidify the milk while simultaneously acting as a jellyifying agent as the pH is lowered; and
  (3) about 2.5 to about 20 g of a mild acidic buffer, said buffer being effective to control the decreasing pH when mixed with the milk thereby preventing the milk product from turning too sour; and said buffer being further characterized in that upon mixing with said water, said buffer causes the time duration for jellying of the resulting mixture to be reduced by reducing the pH of the mixture close to the point of jellying, whereafter said acidogen need further reduce the pH only a short range of about 0.3 to about 0.9 pH units.

8. An article of manufacture according to claim 7 wherein said acidogen is adapted to undergo spontaneous hydrolysis in aqueous medium and is selected from the group consisting of lactones, anhydrides and a combination of an ester an an esterase enzyme.

9. An article of manufacture according to claim 7 wherein said acidogen is selected from the group consisting of glucono delta lactone, lactide, propionic anhydride, propionic-isovaleric mixed anhydride, acetic-isovaleric mixed anhydride, aceticvaleric mixed anhydride and acetic butyric mixed anhydride.

10. An article of manufacture according to claim 7 wherein said acidogen is selected from the group consisting of esters of citric, tartaric, acetic, malic, lactic, fumaric, maleic and adipic acid in combination with enzyme esterase.

11. An article of manufacture according to claim 7 wherein said buffer is selected from the group consisting of sodium citrate monobasic, sodium citrate dibasic, calcium phosphate monobasic, sodium phosphate monobasic, sodium tartarate monobasic, or a combination thereof.

12. A method for the manufacture of an instant yogurt composition having the texture, appearance and taste of natural yogurt by the steps comprising:
 (a) forming a powdered dry mix composition comprising:
  (1) about 10 to about 50 g of an acidogen, said acidogen being adaptive to undergo spontaneous hydrolysis in aqueous medium and turning to acid gradually so as to homogeneously acidify milk thereby simulating the action of the bacterial fermentation of lactose, while simultaneously acting as a jellyifying agent as pH is lowered; and,
  (2) about 2.5 to about 20 g of a mild acidic buffer, said buffer being effective to control decreasing pH when mixed with milk thereby preventing the milk product from turning too sour;
 (b) mixing said dry mix composition with milk in a ratio of about one liter of milk for said composition in (a);
 (c) gently stirring the resulting mixture for about 1 to 4 minutes and
 (d) allowing the resulting mixture to stand to produce the instant yogurt composition; said instant yogurt composition being further characterized in that when said dry mix composition is mixed with said milk, said buffer causes the time duration of jellying of the resulting mixture to be reduced by reducing the pH of the mixture close to the point of jellying whereafter said acidogen need further reduce the pH only a short range of about 0.3 to about 0.9 pH units.

13. A method for the manufacture of an instant yogurt composition having the texture, taste and appearance of natural yogurt by the steps comprising:
 (a) forming a powdered dry mix composition comprising:
  (1) about 10 to about 50 g of an acidogen, said acidogen being adapted to undergo spontaneous hydrolysis in aqueous medium and turning to acid gradually so as to homogeneously acidify milk thereby simulating the action of the bacterial fermentation of lactose, while simultaneously acting as a jellyifying agent as pH is lowered; and,
  (2) about 2.5 to about 20 g of a mild acidic buffer, said buffer being effective to control decreasing pH when mixed with milk thereby preventing the milk product from turning too sour;
  (3) about 90 to 240 g of dry milk,
 (b) mixing said dry mix composition with water in a ratio of about one liter of water for said composition in (a);
 (c) gently stirring the resulting mixture for about 1 to 4 minutes and
 (d) allowing the resulting mixture to stand to produce the instant yogurt composition; said instant yogurt composition being further characterized in that when said dry mix composition is mixed with said water, said buffer causes the time duration of jellying of the resulting mixture to be reduced by reducing the pH of the mixture close to the point of jellying whereafter said acidogen need further reduce the pH only a short range of about 0.3 to about 0.9 pH units.

* * * * *